March 21, 1961 R. W. GILBERT 2,976,486
RESISTANCE COMPARATOR
Filed Jan. 16, 1958
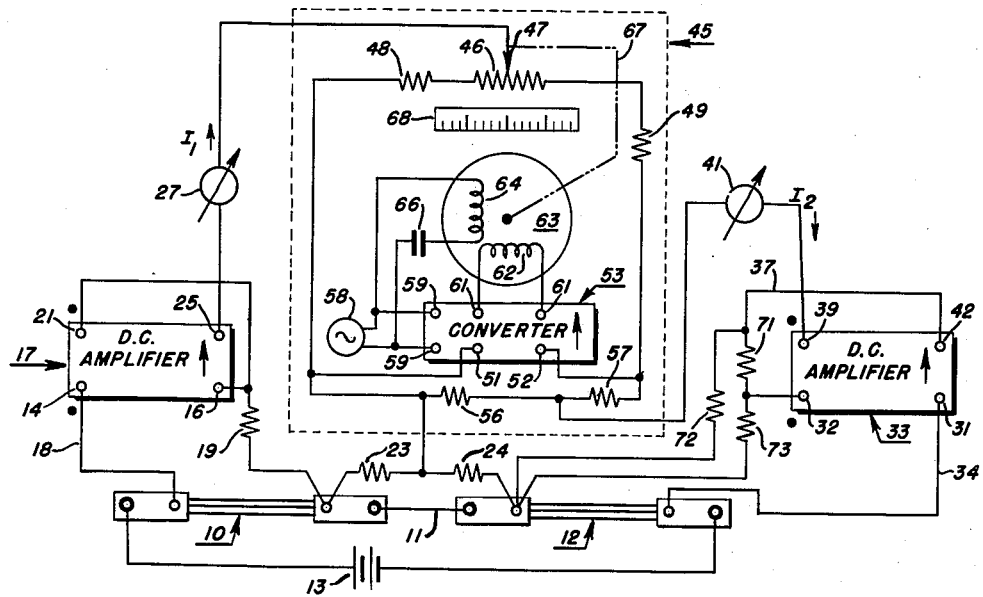
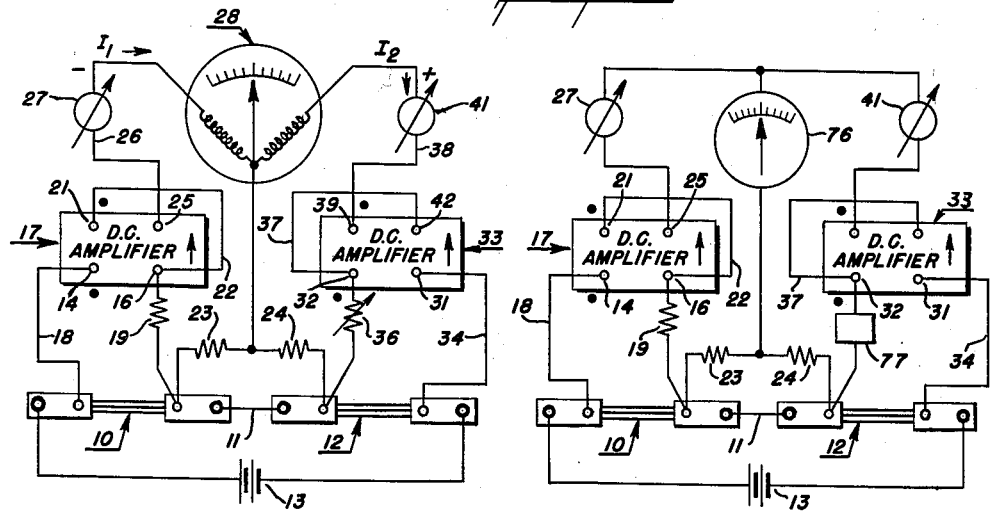
ROSWELL W. GILBERT
INVENTOR.
BY
Rudolph J. Junick
ATTORNEY २,976,486
Patented Mar. 21, 1961

2,976,486

RESISTANCE COMPARATOR

Roswell W. Gilbert, East Orange, N.J., assignor to Daystrom, Incorporated, Murray Hill, N.J., a corporation of New Jersey Filed Jan. 16, 1958, Ser. No. 709,404

24 Claims. (Cl. 324—63)

This invention relates to a comparator device, or system, for the comparison of resistances or potentials.

The system of my invention is particularly adapted for use in the resistance measurements of a low resistance shunt to a high degree of accuracy. Shunt resistors are often made of a plurality of sheets, or bars, of manganin connected in parallel between massive copper terminal blocks. The terminal blocks are provided with current and potential terminals resulting in a four-terminal resistor. Heretofore, the Kelvin, or double-bridge, which is considered the standard type bridge for the measurement of low resistance four-terminal resistors, has been used in the measurement of such shunt resistances. The Kelvin bridge, however, involves somewhat elaborate circuitry even when multiple-deck dial switches are employed therein to somewhat simplify the manipulation. Although the Kelvin bridge has been used consistently in the measurement and adjustment of shunts, the manipulation required, along with constant maintenance of the equipment, is not as simple as is desirable.

My novel comparator system overcomes the limitations and objections of prior art systems by utilizing direct current amplifiers individually connected to the test and standard shunt to produce amplifier output currents which are proportional to the individual potential drops across the shunts, and then compare the current outputs in another network. The amplifiers are each provided with a feedback circuit. It is possible to tie the two amplifier outputs together in any of several types of ratio indicators since, with a millivolt amplifier input and proportional milliampere output, the output remains truly proportional to the input regardless of the resistance loading in the current output circuit, up to the limit of the ability of the amplifier to supply output voltage. My novel resistance comparator utilizes, then, the pure transfer characteristics of full feedback amplifiers which is not possible with passive circuits.

An object of this invention is the provision of a system for measuring low resistance values with high accuracy, speed, and simplicity of operation.

An object of this invention is the provision of a resistance comparator system for comparison of a low resistance shunt with that of a resistance standard.

An object of this invention is the provision of a resistance comparator system utilizing full feedback amplifiers in the comparison of the voltage drops across test and standard shunts.

An object of this invention is the provision of a resistance comparator for low-valued resistors comprising D.-C. feedback amplifiers having as inputs the voltage drop across a shunt and test resistor, respectively, and means indicating the ratio of amplifier output voltages.

These and other objects and advantages will become apparent from the following description when taken with the accompanying drawings. It will be understood that the drawings are for purposes of illustration and are not to be construed as defining the scope or limits of the invention, reference being had for the latter purposes to the appended claims.

In the drawings wherein like reference characters denote like parts in the several views:

Figure 1 is a diagrammatic representation of my novel resistance comparator utilizing an indicating ratio meter;

Figure 2 is a diagrammatic representation of the resistance comparator utilizing a self-balancing ratio indicator of limited range; and Figure 3 is a diagrammatic representation of the resistance comparator utilizing a galvanometer balance indicator.

Reference is first made to Figure 1 of the drawings wherein a standard shunt 10, connecting link 11, and a test shunt 12 are shown connected in series across a source of direct current 13. The current shunts 10 and 12 may be of conventional four-terminal design comprising a plurality of manganin members having solid copper terminal blocks attached to the ends thereof. The terminal blocks are provided with current and potential terminals; the current terminals being utilized in the above-mentioned series circuit connection across the direct current source 13. The current source is preferably adjustable by any suitable means, not shown in the drawings, and supplies current up to 50,000 amperes, for example. The voltage drop developed across the potential terminals of the standard shunt 10 is applied to the input terminals 14 and 16 of a direct current amplifier 17 through a lead wire 18 and a feedback resistor 19, respectively; the latter being connected to one amplifier output terminal 21 through a lead wire 22. Two shunt isolating resistors 23 and 24 bridge the potential terminals of the two shunts 10 and 12 and serve as return circuits for the amplifier output currents, designated $I_1$ and $I_2$. The amplifier output current $I_1$ flows from the output terminal 25 through the lead 26, direct current indicating instrument 27, a portion of a winding comprising a center-tapped instrument coil of a direct current ratio meter 28, shunt resistor 23, feedback resistor 19, and the lead 22 to the amplifier output terminal 21. Thus, by passing the amplifier output current through the feedback resistor 19, the amplifier 17 is arranged to maintain a potential balance against the voltage drop across the potential terminals of the standard shunt 10.

The potential drop developed across the test shunt 12 is applied to the input terminals 31 and 32 of a second direct current amplifier 33 through the lead 34 and an adjustable feedback resistor 36, respectively, the latter being connected to the amplifier output circuit by the lead 37. In this case, the amplifier output current $I_2$ flows through the loop comprising the lead 38 which is connected to the amplifier output terminal 39, the direct current indicating instrument 41, a portion of the winding of the direct current ratio meter 28, the shunt resistor 24, the adjustable feedback resistor 36, and the lead 37 to the amplifier output terminal 42. Consequently, the amplifier 33 is arranged to maintain a potential balance against the voltage drop across the test shunt 12.

It is clear, then, that the individual output currents of the amplifiers 17 and 33 flow through the instruments 27 and 41, respectively, and that the ratio of these output currents is indicated by the direct current ratio meter 28.

In practice, the feedback resistor 19 is a 50 ohm resistor of good accuracy. The two shunt resistors 23 and 24 are 1,000 ohm resistors which are nominally alike since, with unity ratio of the output currents, the anomalous voltage across them to be absorbed in the amplifier circuits is evenly divided. Lower values can be used, and the circuit will function correctly even if one of these is reduced to zero. Where multiple leads to the potential terminals of the shunts 10 and 12 are necessary, it is important that these be completely independent up to the shunt potential terminals. In practice, the several leads are soldered in adjacent holes in a relatively heavy copper lug clamped to the potential terminal on the shunt.

In operation, the direct current power supply is adjustable, by any suitable means not shown in the drawings. When the voltage of the power supply is adjusted to the position wherein 50 millivolts, for example, appear across the standard shunt 10 and the associated amplifier 17, it causes the amplifier output current to rise until the IR drop of this current through the feedback resistor 19 balances the 50-millivolt value. Thus, on applying a 50-millivolt input, the output current $I_1$ through the meter 27 rises to 1 milliampere and holds this value. The transconductance of the amplifier 17 with a 50-ohm coupling resistor could be considered 20,000 micromhos, or the reciprocal of 50 ohms.

Similarly, in the amplifier network connected to the test shunt 12, for 1-milliampere output to balance 50 millivolts, the resistance of the adjustable feedback resistor 36 must be 50 ohms. This would be the condition if the test shunt were exactly equal to the standard shunt, and the ratio meter 28 would then indicate unity. If, however, the test shunt 12 is 10 percent low in resistance, for example, giving 45 millivolts under the same conditions, 0.9 milliampere will be developed in the output, flowing through the meter 41. Under these conditions, the ratio meter 28 will indicate 0.9, thereby indicating that the test shunt 12 is 10 percent low in resistance. The test shunt could then be adjusted, as by the removal of manganin therefrom, to produce unity on the ratio meter. In this manner, the shunt may be adjusted to the standard.

It will be understood that the test shunt 12 may be adjusted to values other than that of the standard shunt 10. For example, if the test shunt has twice the current rating of the standard shunt (for 50 millivolts drop), or half the resistance, then by adjustment of the direct current source 13, a current to produce 50 millivolts in the standard shunt 10 will produce only 25 millivolts in the test shunt 12. To get a balance or a unity ratio indication that the test shunt is correctly adjusted, the value of the adjustable feedback resistor 36 becomes 25 ohms so that the 1 milliampere output produces 25 millivolts through the resistor 36. In other words, at unity ratio, or balance of the output current of the two amplifiers, $$\frac{R_{12}}{R_{10}} = \frac{R_{36}}{50} \quad (1)$$

wherein $R_{12}$, $R_{10}$ and $R_{36}$ are the values of resistance of the test shunt 12, standard shunt 10 and feedback resistor 36, respectively, while 50 is the fixed value of the feedback resistor 19. Then for a unity indication of the ratio meter 28 showing the test shunt to be correctly adjusted to its rated value, $$R_{36} = 50\left(\frac{R_{12}}{R_{10}}\right) \quad (2)$$

Alternatively, in terms of shunt rating in amperes for the same millivolt values, $$\frac{\text{Standard shunt rating}}{\text{Test shunt rating}} = \frac{R}{50} \quad (3)$$

or $$R = 50\left(\frac{\text{Standard shunt rating}}{\text{Test shunt rating}}\right) \quad (4)$$

A direct-reading direct current ratio meter, such as the ratio meter 28 of Figure 1, operating in the range of 1 milliampere, obviously has limited sensitivity. In Figure 2 of the drawings there is shown a resistance comparison system utilizing a self-balancing ratio indicator, which system has a greater sensitivity than the system of Figure 1. Referring, then, to Figure 2, it will be noted that the amplifier outputs $I_1$ and $I_2$ are fed to a self balancing ratio indicator circuit 45 which includes a slide wire 46 and movable contact arm 47. The lead wire from the amplifier output terminal 25 of the amplifier 17 is connected through the ammeter 27 to the movable slide-wire arm 47. The slidewire 46 is connected through resistors 48 and 49 to the input terminals 51 and 52, respectively, of a converter 53. The lead wire from the amplifier output terminal 39 of the amplifier 33 is connected through the ammeter 41 to the self balancing ratio indicator circuit through the circuit resistors 56 and 57. Although the exact resistance value of resistors 56 and 57 are not important, they are preferably substantially equal to each other to an accuracy of better than 0.02 percent.

The converter 53, which has not been shown in detail, may be of any suitable type, such as a chopper. A typical chopper includes a movable contact which is actuated in opposite directions to alternately make and break electrical contact with a pair of spaced fixed contacts. Vibration of the movable contact is obtained by use of a source of alternating potential 58 connected to terminals 59 in the chopper. Any potential unbalance appearing across the input terminals 51 and 52 of the chopper is converted to a pulsating potential at the chopper output terminals 61; the direction and magnitude of the pulsating current depending upon the direction and amount of unbalance of the slidewire arm 47 on the slidewire 46. The pulsating converter output may be amplified (no amplifier being shown in the drawing) and fed to the control winding 62 of a two phase motor 63. The reference winding 64 of the motor is connected to the source of alternating potential 58 through a capacitor 66. The motor 63 will thus be energized for rotation in one direction or the other, depending upon the phase of the current in the control winding 62 with respect to the current in the reference winding 64. The motor is connected through suitable mechanical linkage 67 to the movable contact 47 and moves the contact in a direction to rebalance the system. A suitable scale 68 is provided adjacent the slidewire and movable contact whereby the relative position of the movable contact along the slidewire may be noted; unity ratio being indicated a distance from the center of the scale for reasons which will become obvious.

The resistance comparator of my invention is designed for the precision comparison of shunt resistors whose differences are small. With today's methods of fabrication and fine materials, shunts as assembled generally run from 1 to 5 percent low in resistance before adjustment. For this reason, a self-balancing ratio indicator having a span of 10 percent would appear adequate; with a scale ranging, for example, from 92 to 102 percent of nominal shunt rating. In the above 10 percent span covering 92 to 102 percent, with a slidewire resistance of $s$ ohms, the resistance of resistor 48 is $9.2s$ and the resistance of resistor 49 is $9.8s$. Exact slidewire values are difficult to achieve, and are not necessary here since any value of slidewire resistance from substantially 50 to 200 ohms may be used. With a 100 ohm slidewire, for the above 10 percent span, for example, resistors 48 and 49 are 920 and 980 ohms, respectively.

Obviously, it is convenient to utilize the self-balancing ratio indicator to compare shunt resistors which are not equal in value. This may be arranged by making the amplifier feedback network variable. In Figure 1 of the drawings, the feedback resistor 36 is shown as a variable resistor which includes contacts. Resulting variations in the resistance of the resistor contacts are undesirable in the circuit of Figure 2. For this reason, the variable resistor 36 of Figure 1 is replaced by the resistance network comprising resistors 71, 72 and 73; the resistors 72 and 73 each being 100 ohms for a feedback resistance of 50 ohms for feedback resistor 19. The value of resistance of resistor 71, designated $R_{71}$, may be determined by:

$$R_{71} = \left[\left(\frac{R_{12}}{R_{10}}\right) - 1\right] \times 200 \text{ ohms} \qquad (5)$$

This particular arrangement of resistors 71, 72 and 73 assumes that the test shunt will always have a higher rating than the standard shunt, a rather desirable procedure in practice in the adjustment of shunts. Thus, for the same current rating of the test and standard shunts, $R_{71}=0$; while for a test shunt rated at twice the current of the standard shunt (for the same millivolt drop) $R_{71}=200$ ohms, for example. With standard shunts or registors in decade steps, $R_{71}$ may have a maximum value of 2000 ohms; the smallest rating ratio will be 1.2 where $R_{71}=40$ ohms. Values of $R_{71}$ in this network are thus large enough so that contact resistance up to 0.01 ohm can be disregarded.

For a practical installation, the D.-C. instruments 27 and 41 are of 1 milliampere range, and indicate the output current of the amplifiers 17 and 33, respectively. For maximum accuracy, the D.-C. voltage source 13 is adjusted (by means not shown) until approximately 1 milliampere exists in the amplifier outputs. This is essential since the amplifiers fail to be proportional due to overloading at about 2 milliamperes. By the same token, with a given resolution, best accuracy is obtained with an adequate input level.

The resistance comparator of my invention may be used as a resistance-measuring bridge, as shown in Figure 3. Referring, then, to Figure 3, it will be noted that the circuit is similar to that of Figure 1 except that the direct current ratio meter of Figure 1 is replaced by a null galvanometer 76. Further, a resistance, comprising preferably, of a resistance decade box 77, is substituted for the variable feedback resistor of Figure 1. With the arrangement shown in Figure 3, when the resistance of the decade box 77 is adjusted to indicate a null in the galvanometer, and with a 50 ohm feedback resistor 19 in the standard shunt amplifier circuit, the resistance value of the shunt 12 is $$50\frac{R_{12}}{R_{77}}$$

wherein $R_{77}$ is the value of resistance of the decade box.

It will here be noted that the output device in each of the illustrated embodiments, i.e. the ratio meter 28 of Figure 1, the self-balancing ratio indicator 45 of Figure 2 and the two-terminal galvanometer 76 of Figure 3, each comprise a conductive device whereby the amplifier outputs are conductively connected together. Obviously, if the amplifier outputs were not so coupled, but instead were independent of each other, the need for the novel circuit would be eliminated. For example, if a ratio meter having two separate windings were employed as the output device with the amplifier outputs connected to individual windings thereof, there would be no conductive connection between the amplifier outputs, and consequenly, there would be no need for the circuit of my invention. In short, the novel circuit arrangement provides means whereby an output device which provides, or requires, a conductive connection between amplifier outputs may be employed in a comparator circuit of the type capable of comparing two potentials separated by a random, anomalous voltage.

The resistance comparator device of my invention is extremely accurate. If, for example, all power is disconnected and the pointer of the ratio indicator 28 of Figure 1 is moved manually to a different position, when current is again applied, the previous value is indicated to within 0.05 percent on the scale. Shunts adjusted using the equipment have been found to check on a conventional Kelvin bridge to better than 0.01 percent. As a practical matter, the simplicity of operation of the equipment results in more accurate shunt adjustments even with the same allowed tolerances.

It will be understood that any suitable direct current amplifiers 17 and 33 may be utilized. The D.-C. amplifier shown and described in my United States Patent No. 2,744,168 which issued May 1, 1956, and is entitled, D.-C. Amplifier, is one example of a suitable D.-C. amplifier which may be used in my novel resistance comparator circuits. With the above-mentioned D.-C. amplifier, the resistance comparator results are independent of the loading of the amplifier output, provided the drop is not over 5 volts. To prove this, up to 6,000 ohms of resistance may arbitrarily be added to one of the amplifier output circuits before any change in the indication becomes apparent. Although a 1 milliampere amplifier output is desirable, with the circuit parameters described above, in the figure descriptions, 0.10% accuracy can still be maintained at as low as 1/10 nominal rated current (0.1 milliampere in the amplifier output) with amplifiers having a suitable resolution, which allows for adjusting and checking shunts rated at 50,000 amperes, for example, and using a 5,000 ampere direct current power supply 13.

It will be seen, then, that my novel resistance comparator provides a powerful method for measuring low resistances in a straight forward and direct manner to a good degree of accuracy. With amplifiers having a resolution of less than 5 microvolts, if sufficient current is put through the test and standard shunt resistors under test to produce about 50 millivolts in each, the basic resolution is 1 part in 10,000. Taking into account all other factors and assuming the important circuit resistors are adjusted to 0.02%, an over-all accuracy of 0.1% is readily obtainable.

Having now described my invention in detail in accordance with the patent statutes, various other changes and modifications will suggest themselves to those skilled in this art, and it is intended that such changes and modifications shall fall within the spirit and scope of the invention as recited in the following claims.

I claim:

1. In a potential comparator device for the comparison of a first potential source with a second potential source, the said first and second potential sources having a random potential therebetween, first and second direct-current amplifiers each having a pair of input and output terminals, first and second feedback resistors, means connecting the said first and second amplifier input terminals to the said first and second potential sources, respectively, means connecting one amplifier output terminal to one amplifier input terminal of each amplifier for negative feedback, a conductive output device, and means connecting each of the other output terminals to the other input terminals through the said conductive output device and the associated feedback resistors whereby the said other output terminals and other input terminals are conductively connected together, the said first and second potential sources being substantially balanced by the potential drop across the respective feedback resistors, and the current through the output device being independent of the said random potential.

2. The invention as recited in claim 1 wherein the said first feedback resistor is variable.

3. The invention as recited in claim 1 wherein the said output device comprises a direct-current ratio meter comprising a center-tapped instrument coil, the amplifier output current of the first said direct current amplifier flowing through one half of the said instrument coil while the output current of the second said direct current amplifier flows through the other half thereof, the said ratio meter indicating unity when the currents therethrough are of the same value.

4. The invention as recited in claim 1 wherein the said output device comprises a self-balancing ratio indicator system.

5. The invention as recited in claim 4 wherein the said self-balancing ratio indicator system comprises a slide-wire resistance having a movable arm, a converter, means connecting the said slidewire to the said converter input through a first pair of bridge resistors, a reversible motor arranged to shift the said slidewire movable arm across the said slidewire in response to the converter output, a second pair of bridge resistors connected in series circuit relation across the input of the converter, means connecting the said other output terminal of the said first direct current amplifier to the junction between the said second pair of bridge resistors, means connecting the said other output terminal of the said second direct current amplifier to the said movable slidewire arm, and means connecting one converter input terminal to said other direct current amplifier input terminals through the associated feedback resistors.

6. The invention as recited in claim 1 wherein the said output device comprises a two terminal direct current galvanometer.

7. The invention as recited in claim 6 wherein the said direct current galvanometer is connected between a junction between the said other output terminals of the direct current amplifiers and the said feedback resistors.

8. In a resistance comparator device for the resistance comparison of a first resistor with a second resistor, the said first and second resistors being connected together through a connecting link having resistance, a source of direct current, the said first and second resistors being in series across the said source of direct current, first and second direct current amplifiers each having a pair of input and output terminals, first and second feedback resistors, means connecting the said first and second amplifier input terminals to the said first and second resistors through the said first and second feedback resistors, respectively, means connecting one amplifier output terminal to one amplifier input terminal of each amplifier for negative feedback, a conductive output device, and means connecting each of the other output terminals to the other input terminals through the said output device and the associated feedback resistors whereby the said other output terminals and other input terminals are conductively connected together, the potential drop across the said first and second resistors being substantially balanced by the potential drop across the respective feedback resistors, and the current through the output device being independent of the potential drop across the connecting link between the said first and second resistors.

9. The invention as recited in claim 8 wherein the said first feedback resistor is variable.

10. The invention as recited in claim 8 wherein the said output device comprises a direct-current ratio meter comprising a center-tapped instrument coil, the amplifier output current of the first said direct current amplifier flowing through one half of the said instrument coil while the output current of the second said direct current amplifier flows through the other half thereof, the said ratio meter indicating unity when the currents therethrough are of the same value.

11. The invention as recited in claim 8 wherein the said output device comprises a self-balancing ratio indicator system.

12. The invention as recited in claim 8 wherein the said output device comprises a two terminal direct current galvanometer.

13. In a resistance comparator device for the resistance comparison of a test shunt with a standard shunt, a connecting link having resistance connecting the said test and standard shunts together, a source of direct current, means connecting the said connected test and standard shunts in series across the said source of direct current, first and second direct-current amplifiers each having a pair of input and output terminals, first and second feedback resistors, means connecting the said first and second amplifier input terminals to the said test and standard shunts through the said first and second feedback resistors, respectively, means connecting one amplifier output terminal to one amplifier input terminal of each amplifier for negative feedback, a conductive indicating device, and means connecting each of the other output terminals to the other input terminals through the said indicating device and the associated feedback resistors whereby the said other output terminals and other input terminals are conductively connected together, the potential drop across the said test and standard shunts being substantially balanced by the potential drop across the respective feedback resistors, and the current through the indicating device being independent of the potential drop across the said connecting link between the said test and standard shunts.

14. The invention as recited in claim 13 wherein the said first feedback resistor is variable.

15. The invention as recited in claim 13 wherein the said indicating device comprises a direct-current ratio meter comprising a center-tapped instrument coil, the amplifier output current of the first said direct current amplifier flowing through one half of the said instrument coil while the output current of the second said direct current amplifier flows through the other half thereof, the said ratio meter indicating unity when the currents therethrough are of the same value.

16. The invention as recited in claim 13 wherein the said indicating device comprises a self-balancing ratio indicator system.

17. The invention as recited in claim 16 wherein the said self-balancing ratio indicator system comprises a slidewire resistance having a movable arm, a converter, means connecting the said slidewire to the said converter input through a first pair of bridge resistors, a reversible motor arranged to shift the said slidewire movable arm across the said slidewire in response to the converter output, a second pair of bridge resistors connected in series circuit relation across the input of the converter, means connecting the said other output terminal of the said first direct current amplifier to the junction between the said second pair of bridge resistors, means connecting the said other output terminal of the said second direct current amplifier to the said movable slidewire arm, and means connecting one converter input terminal to said other direct current amplifier input terminals through the associated feedback resistors.

18. The invention as recited in claim 13 wherein the said indicating device comprises a two terminal direct-current galvanometer.

19. The invention as recited in claim 18 wherein the said direct-current galvanometer is connected between a junction between the said other output terminals of the direct-current amplifiers and the said feedback resistors.

20. In a potential comparator device for the comparison of first and second potential sources separated by a random potential, first and second direct-current amplifiers, each amplifier being of the type responsive to voltage input and delivering an output current proportional to the said voltage input, the said first and second potential sources providing inputs to the respective first and second amplifiers, a resistor connected between the said first and second potential sources across the said random potential, and conductive means responsive to the difference between the output currents of the said amplifiers and providing a conductive path between the amplifier outputs, the said last mentioned means being connected through the said resistor to an amplifier input, the difference between the output currents of the amplifiers being independent of the said random potential developed across the said resistor.

21. In a potential comparator device for the comparison of first and second potential sources separated by a random potential, first and second direct-current amplifiers of the type responsive to voltage input and delivering an output current proportional to the said voltage input, the said first and second potential sources providing inputs to the respective first and second amplifiers, a pair of series connected resistors connected between the said first and second potential sources across the said random potential, and conductive means conductively connecting the amplifier outputs together and to the junction between the said pair of series connected resistors, the said last-mentioned means being responsive to the difference between the output currents of the amplifiers.

22. In a potential comparator device for the comparison of first and second potential sources separated by a random potential, first and second direct-current amplifiers of the type responsive to voltage input and delivering an output current proportional to the said voltage input, the said first and second potential sources being connected to the respective first and second amplifiers and providing inputs thereto, a resistor connected between the said first and second potential sources across the said random potential, and conductive means conductively connecting the amplifier outputs together and to the said resistor, the said last-mentioned means being responsive to the difference between the output currents of the amplifiers.

23. In a resistance comparator device for the resistance comparison of first and second resistors connected together through a connecting link having resistance, a source of direct current connected across the series connected first and second resistors and connecting link and thereby developing a first, second and random potential across the said first and second resistors and connecting link, respectively, first and second direct current amplifiers of the type responsive to the voltage input and delivering an output current proportional to the said voltage input, means connecting the said first and second resistors to the inputs of the respective first and second amplifiers to provide the said first and second amplifiers with the said first and second potential inputs, respectively, a pair of series connected isolating resistors connected across the connecting link, and conductive means conductively connecting the amplifier outputs together and to the junction between the said pair of series connected isolating resistors, the said last-mentioned means being responsive to the difference between the output currents of the amplifiers.

24. In a resistance comparator device for the resistance comparison of first and second resistors connected together through a connecting link having resistance, a source of direct current connected across the series connected first and second resistors and connecting link and thereby developing a first, second and random potential across the said first and second resistors and connecting link, respectively, first and second direct current amplifiers of the type responsive to the voltage input and delivering an output current proportional to the said voltage input, means connecting the first and second resistors to the inputs of the respective first and second amplifiers to provide the said first and second amplifiers with the said first and second potential inputs, respectively, an isolating resistor connected in shunt circuit with the said connecting link, and conductive means conductively connecting the amplifier outputs together and to the said isolating resistor, the said last-mentioned means being responsive to the difference between the output currents of the amplifiers.

References Cited in the file of this patent

UNITED STATES PATENTS

| | | |
|---|---|---|
| 1,917,417 | Zuschlag | July 11, 1933 |
| 2,213,099 | Adorjan | Aug. 27, 1940 |
| 2,498,103 | Wojciechowski | Feb. 21, 1950 |
| 2,659,861 | Branson | Nov. 17, 1953 |
| 2,714,137 | Dzwons | July 26, 1955 |
| 2,716,162 | Pearlman | Aug. 23, 1955 |
| 2,719,262 | Bousman | Sept. 27, 1955 |

OTHER REFERENCES

Konigsberg: "Electronics," Jan. 1, 1957, pp. 175–177.